Patented Jan. 25, 1949

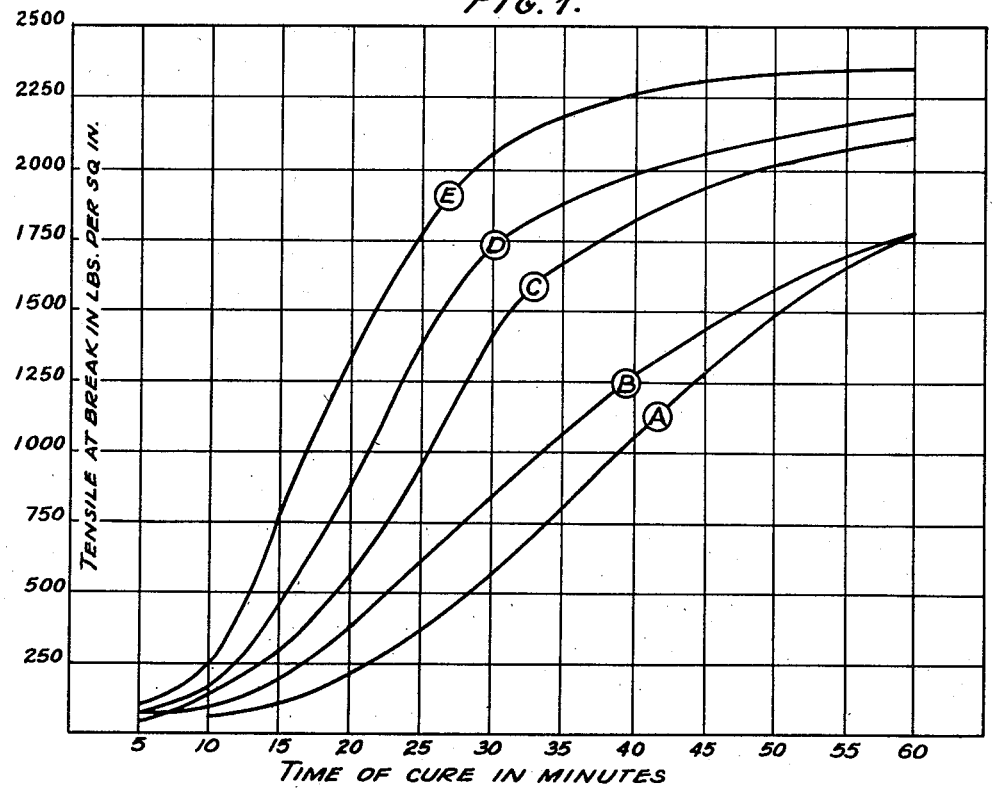

2,459,916

UNITED STATES PATENT OFFICE 2,459,916

VULCANIZATION OF BUTADIENE-STYRENE RUBBERY COPOLYMER

Alva C. Byrns, Los Altos, Calif., and Gerald von Stroh, Coatesville, Pa., assignors to The Permanente Metals Corporation, Oakland, Calif., a corporation of Delaware Application January 26, 1945, Serial No. 574,758

5 Claims. (Cl. 260—79)

This invention relates to a process for compounding synthetic rubber, and to the product therefor.

In the art of curing rubber, a number of processes have been devised for accelerating the rate at which curing proceeds. The acceleration of curing rate entails certain problems, however, and among these it may be noted that along with a quicker cure, the product obtained must not be detrimentally affected with respect to its tensile strength, for certain uses. Also it is important to avoid porosity in the interior portions of a thick piece, such as a rubber heel or a tire, and to prevent scorchiness or over-curing of the rubber from developing as curing heat is applied. Thus while it is desired in practice that rubber or synthetic rubber articles be cured as quickly as possible, it is necessary to adjust the conditions of curing to attain only such a rate of cure as is compatible with the production of rubber having certain characteristics.

A number of accelerators have, therefore, been known to the art which have effectively shortened the time of cure and at the same time have permitted the maximum realization possible under the conditions of curing of the proper qualities of the finished product. It has been known, however, that the addition of a kicker or secondary accelerator is useful with the known primary accelerators. One of the most effective secondary accelerators is ammonia but the difficulties of adding and controlling the addition of this normally gaseous material are obvious, and while in earlier times it was in considerable use in the vulcanizer its employment has practically ceased because of the handling problem and because it cannot easily be applied at the inner portions of the thick pieces.

According to this invention synthetic rubber, particularly of the butadiene copolymer type, is compounded by adding thereto in the compounding operation, as a secondary accelerator, a metallic nitride which is decomposable by water. Suitably the metallic nitride decomposes to give a metal compound, such as an oxide, which is not a deleterious additament in the final compound product and which advantageously may be a usual compounding additament. Advantageously also the metallic nitride is in extremely finely divided form. Examples of metallic nitrides useful in this invention are magnesium nitride, zinc nitride, aluminum nitride etc. The very finely divided metallic nitride, having an average particle size of less than one micron diameter, is preferably prepared by bringing metallic vapor into contact with a nitrogen-yielding gas and recovering the solid product of reaction by treating with a nitrogen-yielding gas the solid metal, or a solid reactive compound of the metal having a particle size as described and obtained by rapid condensation from the vapor state to produce a finely divided material. For example, magnesium or aluminum vapor can be brought into contact with an oxygen-yielding gas to form the finely divided corresponding oxide which can then be reacted to give the nitride. Magnesium nitride is particularly advantageous as a secondary accelerator in the compounding of synthetic rubber, for example butadiene-styrene copolymer synthetic rubber, and the invention will be described specifically with respect to this compound, although it will be understood that other metal nitrides having the properties described above are also effective as secondary accelerators used in conjunction with the organic accelerators known to the art. As will be shown more fully below, according to this invention there is preferably added in the compounding operation as described herein, an amount of nitride to provide from 0.14 to 0.35 lb. equivalent ammonia per 100 lbs. of the copolymer; or from 0.14 lb. to 1.02 lbs. of magnesium nitride, or from 1 lb. to 2.5 lbs. of nitrided carbothermic magnesium dust, per 100 lbs. of the copolymer.

It may be that the magnesium nitride is effective by reason of the circumstance that it readily decomposes to magnesium oxide and ammonia in the presence of water, small amounts of water being present in the rubber being compounded, and, therefore, that the dispersion of magnesium nitride throughout the mass of the synthetic rubber produces ammonia in well-dispersed state and thus enables better and more uniform acceleration of cure. Magnesium oxide is also frequently added in the compounding of synthetic rubber and its presence, therefore, would be not objectionable. Whether this is the correct explanation of the mechanism of the action of magnesium nitride or not, has not been clearly determined, but it is found that the addition of magnesium nitride as a secondary accelerator has several advantages, as will be evident from the description below.

In compounding synthetic rubber or elastomer stocks of butadiene-styrene copolymer synthetic rubber it is generally considered that mercaptobenzothiazole is the preferred accelerator, although other accelerators, for example benso-thiazyldisulfide, are useful also but usually give a slower cure. According to this invention it has been found that magnesium nitride is especially effective in speeding up the cure when used in conjunction with mercaptobenzothiazole, although it is also advantageous to use with other primary accelerators, in the processing of synthetic rubbers of the butadiene copolymer type.

It is an advantage of this invention that the secondary accelerator is easily handled and easily added in compounding the stock, and it is a further advantage that the accelerator acts uniformly through a whole piece so that the inner portions are given a quicker cure as well as the outer surfaces. This reduces any tendency toward porosity where that is undesirable.

The magnesium nitride which is useful in the process and product of this invention can be prepared in a number of ways. One advantageous method of preparing a magnesium nitride composition is by nitriding carbothermic dust, or condensate, recovered in the well-known carbothermic process for making magnesium. In this process, as more fully described by Hansgirg U. S. 1,884,993 and 1,943,601 and by others, magnesium oxide and a carbonaceous reducing agent, such as coke, coal or the like, are reacted in an electric arc furnace at a suitably high temperature, preferably around 2000° C., to yield magnesium and carbon monoxide. This reaction is reversible at temperatures somewhat below the temperature of reaction and to prevent such reversion the vaporous products of reaction are cooled as rapidly as possible upon leaving the reaction zone, for example by shock-chilling with an inert gas such as hydrogen, hydrocarbon or the like. Even with such precautions some back-reaction occurs and the product, referred to herein as "carbothermic dust," comprises solid magnesium in extremely finely divided form, and magnesium oxide and carbon, both of these constituents also being extremely finely divided except for larger pieces which may have been carried over unreacted from the reaction zone. A small amount of other compounds may also be present.

It is a characteristic of the carbothermic dust obtained as described that the particle size is very small, predominantly less than one micron in diameter, and the surface area is correspondingly very great. The carbothermic dust is converted to the nitride in any suitable manner, but preferably by treating with nitrogen or ammonia gas as more fully described in the copending application of Byrns, Serial Number 577,586 filed Feb. 12, 1945. The magnesium nitride composition or nitrided carbothermic dust so obtained is especially suitable in the process and product of this invention, being easily handled and easily added in compounding and having, furthermore, small particle size of substantially the same submicron dimensions as the starting material, and very great surface area and thus a high reactivity under the conditions of compounding. The presence of magnesium oxide and carbon is unobjectionable in that carbon is normally added as compounding ingredient and magnesium oxide also furnishes a small secondary accelerating effect and in this product they also partake of the advantages of very small particle size, besides being apparently bound together in a peculiar manner, as described more completely in the copending application of Von Stroh Serial Number 527,347, filed March 20, 1944, now U. S. Patent No. 2,405,336.

Magnesium nitride of small particle size and high reactivity, and useful in this invention, can also be prepared by reacting the vaporous products of reaction as described above in a stream of air, restricted in amount, obtaining thereby a finely divided mixture of magnesium nitride and magnesium oxide. A highly pure magnesium vapor, if desired, diluted with an inert gas such as $H_2$, He or the like, may be reacted with a nitrogen-yielding gas to produce finely divided solid nitride. This process of preparation of the nitride is described in the copending application of Porter, Serial Number 571,074, filed Jan. 2, 1945. Magnesium nitride prepared in any other manner is useful in the process and product of this invention. However, the magnesium nitride of very small particle size prepared by the various methods described above is especially advantageous for these purposes.

As an example of the method of compounding synthetic rubber or elastomer according to this invention, there are admixed 100 lbs. of butadiene-styrene copolymer synthetic rubber, 50 lbs. carbon black, 5 lbs. zinc oxide, 5 lbs. commercial rubber plasticizer, 2 lbs. sulfur, 1.5 lbs. mercaptobenzothiazole and 1.5 lbs. nitrided carbothermic dust obtained as described above and containing 40.7% magnesium nitride. The whole mixture is worked up in a set of compounding rolls. The compounded elastomer is now allowed to cure in the known manner, at 280° F., and samples are removed for testing after intervals of 5, 10, 15, 20, 30, 45 and 60 minutes. The properties of these samples are compared with those of a butadiene-styrene copolymer synthetic rubber treated in exactly the same manner except that no nitrided carbothermic dust is added in the compounding formula. The properties are also compared of 3 more samples of this batch of butadiene-styrene copolymer synthetic rubber treated in exactly the same manner except that, instead of 1.5 lbs., 1, 2 and 2.5 lbs. respectively of nitrided carbothermic dust are added in the compounding. In the batch wherein no nitrided dust was added, there is no cure evidenced at the end of 5 minutes, although in the batch wherein 1.5 lbs. of nitrided dust were added curing had definitely begun at 5 minutes and the tensile at break averages 50 lbs. per square inch, and, for example, in the batch wherein 2.5 lbs. of nitrided dust were added the tensile at break averages over 80 lbs. per square inch at 5 minutes.

To more clearly illustrate the consistently advantageous effect of magnesium nitride in compounding of synthetic rubber of the butadiene copolymer type, Figure 1 is a graph showing the higher tensile strength at break of the compounded products to which have been added mercaptobenzothiazole alone, and the same accelerator with 1 lb., 1.5 lbs., 2 lbs., 2.5 lbs., respectively, of nitrided carbothermic dust, containing 40.7% magnesium nitride, to 100 lbs. of butadiene-styrene copolymer synthetic rubber in the compounding formula as given above. This figure shows clearly that an early advantage in cure acceleration is obtained when as little as 1 lb. of nitrided carbothermic dust, corresponding to 0.41 lb. magnesium nitride or 0.14 lb. equivalent of ammonia, is added per 100 lbs. of butadiene-styrene copolymer synthetic rubber when curing takes place at 280° F., and that greater advantages are obtained when 1.5 lbs. and more of nitrided dust are added under the same conditions. The results shown in the graph are also in contrast to the compounding of a batch of butadiene-styrene copolymer synthetic rubber with no added primary accelerator but with added nitrided dust. In the latter procedure, no substantial cure is obtained, as is evidenced by a test wherein 1.5% nitrided dust containing 40.7% magnesium nitride is added in a compounding formula as above but wherein no primary accelerator is added. In this test, curing at 307° F. for 60 minutes produces a tensile at break of only 350 lbs. per square inch. The faster rate of cure and the increase in tensile strength when nitrided dust is added along with a primary accelerator is greater than could be accounted for by the accelerating effect which would normally be exerted by the small amount of magnesium oxide thus incorporated into the stock. Higher amounts of magnesium nitride, or nitrided dust, than those shown above can be added, of course, depending upon the properties, such as stiffness, desired in the final rubber product.

Another advantageous feature of the synthetic rubber obtained by compounding butadiene-styrene copolymer synthetic rubber according to the process of this invention is the lower average set-at-break which is obtained therein. Rubber after stretching does not return to its original length when released and set-at-break measures the permanent elongation, as percentage of the original length of a marked section, which is developed by the tension required to break the piece. The lower permanent set, or set-at-break, developed in synthetic rubber as described, compounded with the addition of magnesium nitride, as compared with that developed in the same type of rubber compounded without the addition of nitride is shown in Table I, the tests having also been made on samples of the batches described above. The values in Table I further show that the cure is very well advanced at 30 minutes in the case of the 2.5 lb. dust addition, and even for the 1.5 lb. addition. In contrast to this, the set-at-break for the product without added dust descreases by over 60% in the period from 30 minutes cure to 60 minutes cure, i. e. from 100 to 38. In other words, curing is still proceeding at a fairly high rate.

*Table I*

| Time of Cure | Percentage Permanent Set | | |
| --- | --- | --- | --- |
| | 1.5 lbs. Nitrided Dust/100 lbs. Butadiene-Styrene Copolymer Synthetic Rubber | 2.5 lbs. Nitrided Dust/100 lbs. Butadiene-Styrene Copolymer Synthetic Rubber | Without Nitrided Dust |
| 5 minutes | 150 | 160 | No cure |
| 10 minutes | 163 | 94 | 205 |
| 15 minutes | 113 | 56 | 168 |
| 20 minutes | 73 | 38 | 157 |
| 30 minutes | 41 | 28 | 100 |
| 45 minutes | 33 | 25 | 63 |
| 60 minutes | 28 | 23 | 38 |

In another test, part of a different batch of butadiene-styrene copolymer synthetic rubber is compounded with mercaptobenzothiazole as a primary accelerator, but with no added nitrided carbothermic dust, in a formulation as shown above. In this run the tensile at break after 5 minutes curing at 307° F. averages 140 lbs. per square inch and increases to an average of 2260 lbs. per square inch after 60 minutes of cure at this temperature. Another part of this batch of butadiene-styrene copolymer synthetic rubber is compounded according to the formula given above and including in addition to mercaptobenzothiazole 1.5 lbs. of nitrided carbothermic dust containing 40.7% magnesium nitride. This compounded batch, after curing for 5 minutes at 307° F., shows a tensile at break averaging 560 lbs. per square inch and the tensile increases after 60 minutes at 307° F. to an average of 2560 lbs. per square inch. Mooney scorch tests on runs made from this batch of butadiene-styrene copolymer synthetic rubber show that, while the runs compounded with added nitrided dust show a somewhat higher initial plasticity than the run compounded with only the primary accelerator and no added dust, the former shows a normal rate of decrease of plasticity and scorching does not occur.

It is to be understood that while definite improvements in the acceleration of cure have been obtained with as little as 1 lb. of the nitrided carbothermic dust per 100 lbs. butadiene-styrene copolymer synthetic rubber as shown above, this amount will vary with the conditions of cure and with dusts containing greater or lesser proportions of magnesium nitride. In a dust containing 40.7% of magnesium nitride, the addition of 1.5 lbs. corresponds to the addition of 0.61 lb. of the nitride. If this be considered in relation to the ammonia content, this amount of dust indicates the addition of 0.21 lb. equivalent ammonia. The addition of 2.5 lbs., of the same dust corresponds to the addition of 1.02 lbs., of the nitride. This latter amount indicates the addition of 0.35 lb. equivalent ammonia.

It is sometimes advantageous to treat the magnesium nitride with a substance which is inert to the nitride and which provides a protective surface coating for the material. This minimizes loss of nitrogen as ammonia and keeps down the development of objectionable odors of ammonia in the compounding process. The surface treatment is suitably effected by admixing with the magnesium nitride, or the composition containing it, one of the plasticizers to be used in the compounding formula, e. g. resin, pine tar, petroleum or coal tar oils, sulfonated petroleum product or other plasticizer. Where the plasticizer or softener is normally a solid, it is preferably heated to a temperature at which it can be admixed in the liquid state. The addition of a surface protective agent as described also provides against loss of ammonia by the nitride during storage.

The early increase in tensile strength shown by the batches compounded with nitrided dust is particularly advantageous in stock for extrusion purposes, since a higher modulus is reached in a shorter time. The term "nitrided dust," used in this specification, is intended to mean nitrided carbothermic magnesium dust containing magnesium nitride and prepared as described above.

What is claimed is:

1. As a new product butadiene-styrene copolymer having uniformly admixed therein magnesium nitride particles coated with a plasticizer for synthetic rubber, said nitride being present in the amount of from 0.41 to 1.02 lbs. per 100 lbs. of said copolymer.

2. In the process for sulfur-vulcanization of rubbery butadiene-styrene copolymer in which a compound of the group consisting of mercaptobenzothiazole and benzothiazyldisulfide is added as an accelerator, the step of adding a material of the group consisting of magnesium nitride, aluminum nitride and zinc nitride to accelerate the vulcanization, said material being added in an amount to provide from 0.14 lb. to 0.35 lb. equivalent ammonia per 100 lbs. of said copolymer upon being decomposed by water.

3. In the process for sulfur-vulcanization of rubbery butadiene-styrene copolymer in which a compound of the group consisting of mercaptobenzothiazole and benzothiazyldisulfide is added as an accelerator, the step of adding from 0.41 lb. to 1.02 lbs. finely divided magnesium nitride per 100 lbs. of said copolymer, to accelerate the vulcanization.

4. In the process for sulfur-vulcanization of rubbery butadiene-styrene copolymer in which a compound of the group consisting of mercaptobenzothiazole and benzothiazyldisulfide is added as an accelerator, the step of adding from 1 lb. to 2.5 lbs. of nitrided carbothermic magnesium dust per 100 lbs. of said copolymer to accelerate the vulcanization.

5. In the process for sulfur-vulcanization of rubbery butadiene-styrene copolymer wherein 2 parts by weight of sulfur and 1.5 parts by weight of mercaptobenzothiazole are added per 100 parts by weight of said copolymer, the step which comprises adding from 1 part by weight to 2.5 parts by weight of nitrided carbothermic magnesium dust per 100 parts by weight of said copolymer, to accelerate the vulcanization.

ALVA C. BYRNS.
GERALD von STROH.

REFERENCES CITED

The following references are of record in the file of this patent:

UNITED STATES PATENTS

| Number | Name | Date |
|---|---|---|
| 2,391,330 | Morris et al. | Dec. 18, 1945 |
| 2,405,336 | Von Stroh | Aug. 6, 1946 |

FOREIGN PATENTS

| Number | Country | Date |
|---|---|---|
| 657,147 | France | Jan. 11, 1929 |